(12) United States Patent
Farrell et al.

(10) Patent No.: US 11,954,205 B2
(45) Date of Patent: Apr. 9, 2024

(54) SECURITY CONTROL FOR ELECTRONIC CONTROL UNIT

(71) Applicant: GM GLOBAL TECHNOLOGY OPERATIONS LLC, Detroit, MI (US)

(72) Inventors: Brian Farrell, Troy, MI (US); Joseph E. Ploucha, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 17/848,629

(22) Filed: Jun. 24, 2022

(65) Prior Publication Data

US 2023/0418944 A1 Dec. 28, 2023

(51) Int. Cl.
*G06F 21/57* (2013.01)
(52) U.S. Cl.
CPC ..................... *G06F 21/57* (2013.01)

(58) Field of Classification Search
CPC ....................................................... G06F 21/57
See application file for complete search history.

(56) References Cited

U.S. PATENT DOCUMENTS

| | | | |
|---|---|---|---|
| 10,038,565 B2 | 7/2018 | Alrabady et al. | |
| 2014/0075579 A1* | 3/2014 | Baltes | G06F 21/51 726/30 |
| 2015/0128231 A1* | 5/2015 | Nakajima | H04L 63/0876 726/5 |
| 2016/0344704 A1* | 11/2016 | Stumpf | H04L 63/10 |
| 2016/0344705 A1* | 11/2016 | Stumpf | H04L 9/3213 |
| 2017/0286873 A1* | 10/2017 | Grimault | G06Q 20/3229 |

* cited by examiner

*Primary Examiner* — Beemnet W Dada
(74) *Attorney, Agent, or Firm* — Quinn IP Law

(57) ABSTRACT

A method for securing an electronic control unit (ECU). The method may include generating a granular security control adjustment authorization ticket (G-SCAAT) for securing the ECU according to a plurality of security parameters determined based on to a role selected for a corresponding user. The G-SCAAT may include security values to be used in controlling the ECU to operate according to the security parameters.

19 Claims, 4 Drawing Sheets

SECURITY CONTROL FOR ELECTRONIC CONTROL UNIT

INTRODUCTION

The present disclosure relates to providing security control for an electronic control unit (ECU), such as with a granular security control adjustment authorization ticket (G-SCAAT) configured to adjust security controls of the ECU according to a plurality of selectable roles.

An electronic control unit (ECU) may be considered as a computer, a microcontroller, or other processing element configured to provide or otherwise support one or more operations, functions, processes, etc., such as by outputting corresponding signals, data, controls, and the like to a dependent system. By way of example, when employed with a host device, such as an automobile, various ECUs may be used as an engine control module (ECM), a telematics unit (TU), a powertrain control module (PCM), a transmission control module (TCM), a brake control module (BCM), a central control module (CCM), a central timing module (CTM), a passenger door module (PDM), a system control module (SCM), an airbag control module (ACM), a battery management system (BMS), a general electronic module (GEM), a body control module (BCM), a suspension control module (SCM), and more.

ECUs may be provided from a supplier for installation at a factory of the host device, such as by installing the ECUs as part of an original equipment manufacturer (OEM) assembly line used to assemble an automobile. At the time of factory installation, ECUs may be programmed with an initial set of values configured to calibrate operations of the ECU according to nominal design parameters. This initial set of values may be considered as factory settings or factory values due to the related calibration of the ECU being set at the time of the ECU and/or host device leaving the factory. As part of design development or manufacturing processes, it may be necessary to program the ECU to account for software patches or other operational needs, and it may also be desirable to make additional programming alterations after the ECU is fabricated and/or after the ECU is installed within a host device. With any number of programming needs potentially arising, it may be desirable to have security controls in place to assure authorized individuals are programming the ECU and that the authorized individuals are programming the ECU within authorized programming constraints.

SUMMARY

One non-limiting aspect of the present disclosure contemplates providing security control for an electronic control unit (ECU) or another programmable device. The security control may be based at least in part on a granular security control adjustment authorization ticket (G-SCAAT) configured to adjust security control according to a plurality of security parameters. The security parameters may be set according to a plurality of roles whereby each of the roles may vary programming permissions, capabilities, constraints, requirements, and/or prerequisites for adjusting the security controls. This type of role-by-role basis may be beneficial in setting security parameters at a granular level, and thereby, limiting invalidated security measures to a controllable set of constraints that may be metered out based on a role or roles assigned to a requesting individual or entity.

Disclosed herein is a method for securing an electronic control unit (ECU). The method may include receiving a request associated with a user requesting to program the ECU, selecting a role for the user from a plurality of available roles, and generating a granular security control adjustment authorization ticket (G-SCAAT) for securing the ECU according to a plurality of security parameters determined based on the role selected for the user. The G-SCAAT may specify security values to be used in controlling the ECU to operate according to the security parameters.

The method may include associating a back office counter with the G-SCAAT. The back office counter may be configured to monotonically increase a counter value set for the G-SCAAT according to a predefined schedule.

The method may include performing an authentication process at the ECU based at least in part on receipt of the back office counter. The authentication process may be configured to generate one of a pass determination and a fail determination for an authenticity of the G-SCAAT.

The method may include generating the pass determination if the back office counter matches an expiration counter included as part of the security values, and generating the fail determination if the back office counter fails to match the expiration counter.

The method may include defining the pass determination to additionally require a message authentication code (MAC) included as part of the G-SCAAT to match with an ECU MAC generated at the ECU.

The method may include transmitting a log message from the ECU to a back office indicating the pass or fail determination. The back office may be configured to generate the G-SCAAT and associate the back office counter therewith.

The method may include executing a request-response strategy between the ECU and the back office as at least part of an installation process configured to install the G-SCAAT on the ECU.

The method may include defining each of the plurality of available roles to each include at least one security value differing from the security values of the other roles.

The method may include determining the security parameters to include a plurality of role-based parameters and a plurality of non-role-based parameters. The role-based parameters may have corresponding ones of the security values set according to the role selected. The non-role-based parameters may have corresponding ones of the security values set independently of the role selected.

The method may include determining the security parameters to include one or more partitions within a memory of the ECU capable of being unlocked, and specifying a module identifier (ID) for each partition as part of the security values.

The method may include determining the security parameters to include one or more security control parameters, and specifying one of the security values for each security control parameter.

The method may include determining the security control parameters to include a secure programming application software parameter, a secure programming calibration software parameter, an in-vehicle network message authentication parameter, a secure boot parameter, a host debugging parameter, and a hardware security module (HSM) or trust zone debugging parameter.

The method may include determining the security parameters to include one or more diagnostic unlock level parameters, and specifying one of the security values for each unlock level parameter.

The method may include determining the diagnostic unlock level parameters to include a service parameter, an assembly plant parameter, an over-the-air (OTA) parameter, an engineering parameter, a remote diagnostics parameter, and/or a supplier parameter.

The method may include determining the security parameters to include a creation count parameter, an expiration count parameter, an application not before identifier (NBID) parameter, a hardware secure module (HSM) NBID parameter, a boot/software compatibility ID (BCID) parameter, a security controls adjusted parameter, an unlock levels parameter, a module IDs parameter, an options parameter, and an ignition count parameter.

The method may include determining the security parameters to include an ECU name parameter, an ECU ID parameter, a G-SCAAT signing certificate parameter, a signature parameter, and a message authentication code (MAC) parameter.

Disclosed herein is a method for securing an electronic control unit (ECU). The method may include selecting a profile for securing the ECU from a plurality of available profiles. Each of the profiles may define a plurality of security parameters for correspondingly securing the ECU. The method may further include generating a granular security control adjustment authorization ticket (G-SCAAT) for installation on the ECU, including specifying security values within the G-SCAAT for each of the security parameters defined for the profile selected. The ECU may be configured to secure the ECU according to the security values specified in the G-SCAAT.

The method may include associating a back office counter with the G-SCAAT. The back office counter may be configured to monotonically increase a counter value set for the G-SCAAT according to a predefined schedule. The method may further include performing an authentication process after installing the G-SCAAT on the ECU. The authentication process may include ECU generating one of a pass determination and a fail determination for an authenticity of the G-SCAAT depending on whether the back office counter matches an expiration counter included as part of the security values. The method may yet further include transmitting a log message from the ECU to the back office indicating the pass or fail determination.

The method may include defining each of the plurality of available profiles to each include at least one security value differing from the security values of the other roles, and determining the security parameters to include a plurality of role-based parameters and a plurality of non-role-based parameters. The role-based parameters may have the corresponding security values set according to a role of a user associated with the profile selected. The non-role-based parameters may have the corresponding security values set independently of the role selected.

Disclosed herein is a method for securing an electronic control unit (ECU). The method may include generating a granular security control adjustment authorization ticket (G-SCAAT) for installation on the ECU. The G-SCAAT may specify one or more security values for each of a plurality of security parameters. The method may further include transmitting the G-SCAAT from a back office to the ECU as part of an installation process. The ECU may be configured to secure the ECU according to the security values specified in the G-SCAAT. The method may yet further include transmitting a log message from the ECU to the back office in response to the ECU performing an authentication process for authenticating the security values following installation of the G-SCAAT. The log message may identify one of a pass determination and a fail determination for the authentication process.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
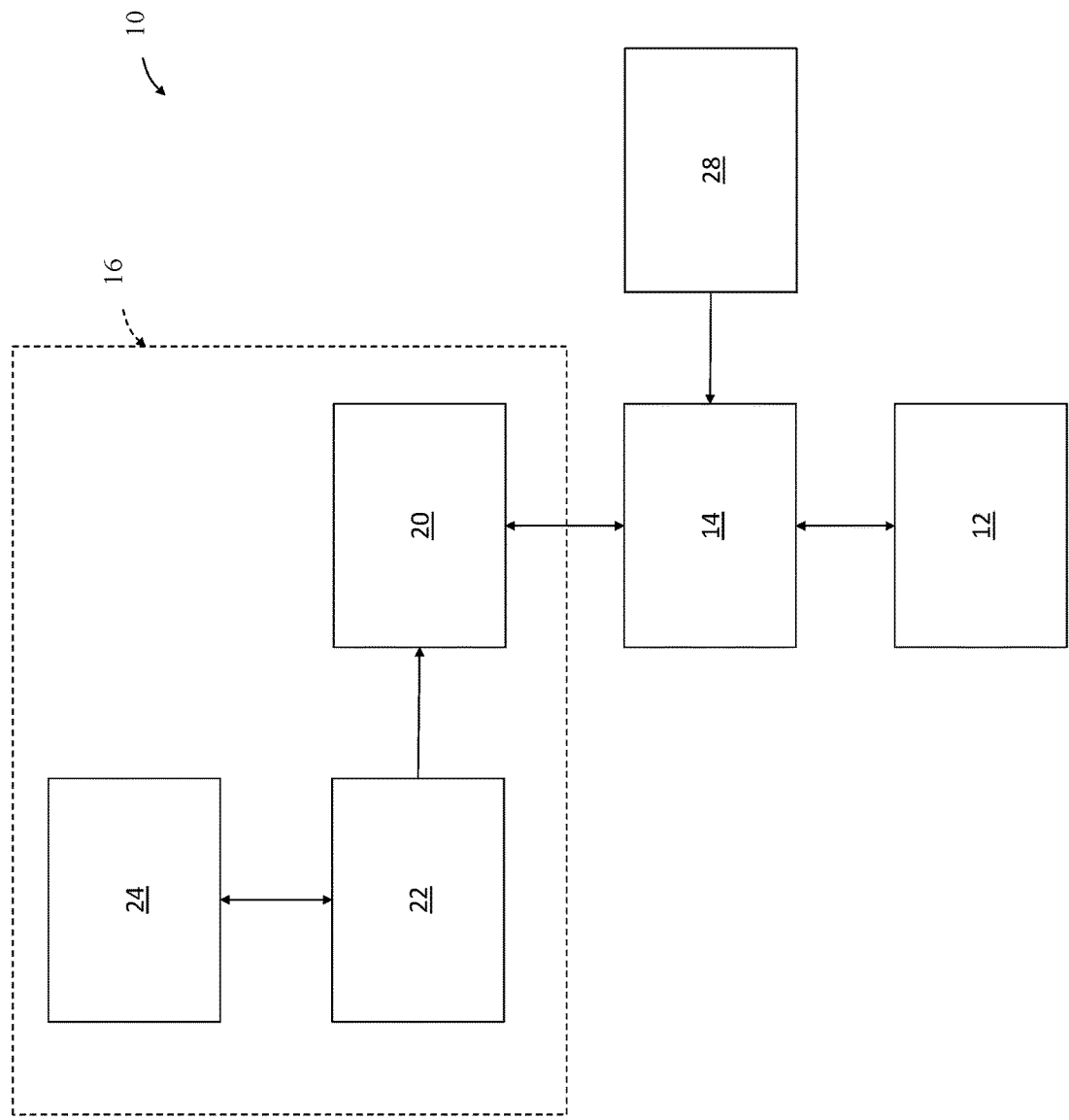
FIG. 1 is a diagram of a system configured for providing security control for an electronic control unit (ECU) in accordance with one non-limiting aspect of the present disclosure.

FIG. 1 is a diagram of a system 10 configured for providing security control for an electronic control unit (ECU) or other programmable device 12 in accordance with one non-limiting aspect of the present disclosure. The system 10 is predominantly described with respect to securing the ECU 12 when included on an automobile (host device) for exemplary purposes as the present disclosure fully contemplates its use and application in securing devices other than ECUs 12 as well as ECUs 12 included within host devices other than automobiles. The system 10 may operate according to interactions between a programming tool 14, a back office 16, and the ECU 12, whereby each cooperates to facilitate a method to govern the action of ECU 12 diagnostic security capabilities according to the methodologies described herein. Each may include a processor configured for executing non-transitory instructions stored on an included memory to facilitate the various operations, functions, and activities described herein, and likewise, each may include suitable interfaces, connections, communication capabilities, etc. needed to implement the process and operations contemplated herein.

The back office 16 may be considered as a trusted authority, such as one under the control or direction of an original equipment manufacturer (OEM) of the host device or another entity tasked with validating soft parts for update and/or generating granular security control adjustment authorization tickets (G-SCAATs) 20 to facilitate the security control. The back office 16 may include a database 22 capable of storing and cross-referencing G-SCAATs 20, soft parts, software installations, etc. with ECU identifiers (IDs) such that the back office 16 may effectively maintain an up-to-date version of each G-SCAAT 20 authorized for each ECU 12. Each G-SCAAT 20 may be comprised of or otherwise associated with ECU IDs, module IDs, part numbers etc. to coordinate the use thereof with files, datasets, or other content having the software, code, programming, etc. The G-SCAATs 20 may be programmed into the ECUs 12 with a corresponding file or structure capable of being transmitted to and acted upon by the ECU 12 to facilitate the security control contemplated herein. The back office 16 may include a portal 24 other interface, e.g., website, configured to receive request messages from purchasers or other individuals, and based thereon, such as according to included credentials, selecting roles and/or other constraints for defining and assigning a G-SCAAT 20 to the requesting user.

The programming tool 14 may interact with the back office 16 to facilitate security control of the ECU 12 according to permissions, entitlements, and other constraints defined in a corresponding one of the G-SCAATs 20. The programming tool 14 may correspond with a device having capabilities sufficient to interact with the ECU 12. The programming tool 14, for example, may correspond with a standalone tester capable of being connected to a network or directly to the ECU 12, e.g., the tester, in the case of a vehicle, may connect to a vehicle network in communication with the ECU 12, and/or the tester may plug directly into a receptable or interface of the ECU 12. The programming tool 14, optionally instead of being an independent tester, may be included within a module or another ECU, e.g., one ECU may act as a programming tool for another ECU. The programming tool 14 may also be located remotely from the device having the ECU 12, such as to facilitate wireless or over-the-air (OTA) updates. The programming tool 14 may include a user interface or a human-machine-interface (HMI) to facilitate interacting with an administrator when needed for entering information and commands associated with user dependent aspects of facilitating an update.

The programming tool 14 may be a generic item or non-specific to the ECU 12 or the host device insofar as it may require information, files, and other data to be loaded thereon. In addition to programming an ECU 12, the programming tool may further support protocol capabilities to manipulated additional aspects of the ECU memory and functionality. The back office 16, for example, may provide the programming tool 14 with a utility file referencing the G-SCAAT 20 and/or other information to be loaded or otherwise programmed onto the ECU 12. The utility file 28 may reference a copy of the software, calibration tables, coding, etc. associated with the G-SCAATs 20 and/or other data sets to be provided to the ECU 12 to facilitate the security control contemplated herein. The utility file 28 may be stored on the programming tool 14 or otherwise provided thereto, such as from the back office 16 through wired or wireless communications. One aspect of the present disclosure contemplates the programming tool 14 being utilized by vehicle technicians or owners while working on the host device. The need to have a separate programming tool 14 or to pre-load the programming tool 14, of course, may not be desired, particularly as the scope of wireless communications increase, such that some or all the interactions described herein may occur directly between the back office 16 and the ECU 12 through wired or wireless signaling.

Figure 2:
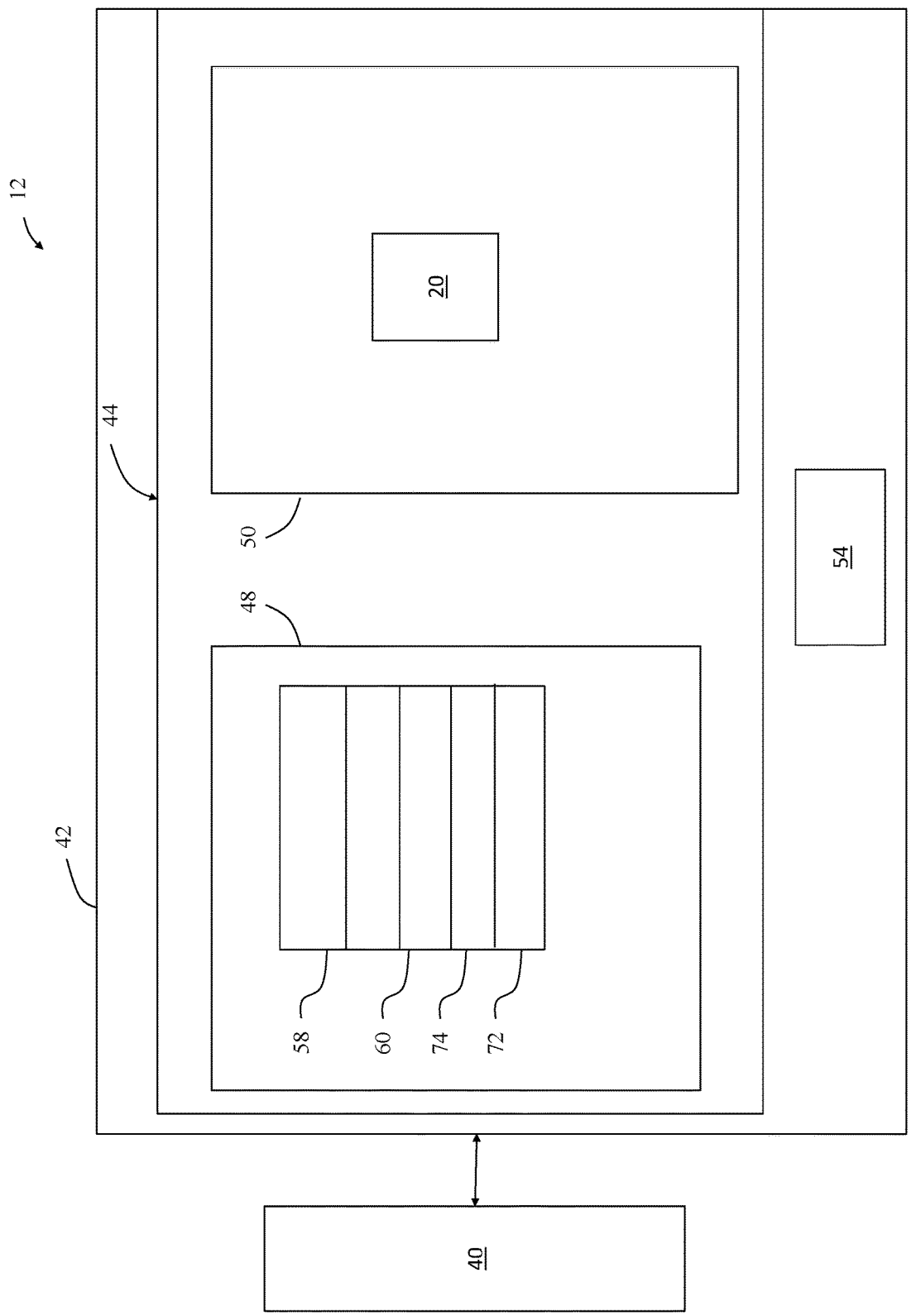
FIG. 2 illustrates a diagram of the ECU in accordance with one non-limiting aspect of the present disclosure.

FIG. 2 illustrates a diagram of the ECU 12 in accordance with one non-limiting aspect of the present disclosure. The ECU 12 may include an interface 40 configured to facilitate exchanging signals, messages, etc. with the programming tool 14, the back office 16, and/or dependent systems. The interface 40 may include corresponding features configured to facilitate the attendant communications, including componentry sufficient to facilitate wired and/or wireless exchanges. The ECU 12 may include a processor 42 configured to control the ECU 12 according to execution of non-transitory instructions stored on an included computer-readable storage medium 44. The storage medium 44 is shown for exemplary, non-limiting purposes as being divided into a normal zone 48 and a secured zone 50. The normal zone 48 may correspond with volatile and/or non-volatile memory configured to permit data stored thereon to be updated, erased, or otherwise manipulated, optionally dependent upon whether the corresponding actor has met certain security protocols. The secured zone 50 may run firmware and support data storage which may be configured such that the data stored thereon in volatile and/or non-volatile memory may be permanent and/or effectively incapable of being directly changed from external functions or sources.

One non-limiting aspect of the present disclosure contemplates the ECU 12 including a bootloader, a boot manager, a bootstrap loader, a control program, or other construct 54 to facilitate loading or otherwise preparing the ECU 12 for operation. The bootloader 54 may be configured to execute upon power up or other initialization of the ECU 12 for purposes of instantiating an application software stored on an application memory 58. The application software may be configured to control operations of the ECU 12. The bootloader 54 may include control software and/or other control logic configured to facilitate controlling instantiation of application software, calibration software and/or for performing other operations contemplated or needed to enable the security control described herein. The bootloader 54, accordingly, is presented in a non-limiting manner to represent a functional feature of the ECU 12 configured to facilitate the operations envisaged herein. The bootloader 54 may be considered to operate separately from the application software in the sense that it may be used to facilitate the operations contemplated herein for security control as well as for directing other operations needed to control the ECU 12 according to commands of the application software.

The application software may be configured to facilitate controlling dependent systems, performing calculations, or otherwise executing processes assigned to the ECU 12. The ECU 12 may be configured to perform a number of controls, particularly when included within an automobile, whereby the corresponding control may be generated according to algorithms, programming, logic, etc. included within the application software facilitating related management of the ECU 12. The application software may be stored on the normal memory 48 within a range of memory partitions separately identifiable according to one or more module IDs configured to logically identify associated clusters of memory. The module IDs, i.e., the portions of the normal memory 48 including the application software, may be used to represent the application memory portion 58 of the memory 44, or portion of the normal memory 48 actively configured to facilitate the application software. One non-limiting aspect of the present disclosure contemplates at least some of the ECU operations executed at the direction of the application software being based at least in part upon calibration data.

The calibration data may be stored in a calibration memory 60 as a plurality of values set for a corresponding plurality of calibration parameters associated with various aspects of the application software, i.e., associated with values being used for different calculations, logic, controls, etc. to be undertaken with the ECU 12. One or more of the calibration parameters may be calibratable in the sense that values used to define the influence thereof may be adjustable from one value to another value in order to induce a resulting influence on the application software. The calibration data may correspondingly be defined as a plurality of calibration parameters having one or more calibratable values. The calibration data, or more particularly the values used to represent the influence thereof, may take various forms and be provided according to various structures, such as in the form of tables, alphanumeric characters, programming/language, etc.

One non-limiting aspect of the present disclosure contemplates enabling a purchaser, an owner, or another entity, such as OTA server at the back office, to program the ECU 12 according to the security control described herein. This security control, i.e., changing of the programmed data, values, etc. from one value to another, may require programming, coding or otherwise writing over a portion of the memory 48 having the previously stored value(s). The programming may be facilitated with the bootloader 54 or control software associated with the bootloader 54. The bootloader 54, for the sake of explanation, may be configured to control adding and removing data to the memory 44 according to the security protocols associated with the related memory, and thereafter, initializing the ECU 12 to act accordingly.

The bootloader 54 may require an authenticity check before permitting changes to the data, calibratable values, etc. stored on the memory 44. The authenticity check may correspond with a verification process whereby a digital signature for the data, software, etc. to be added/changed is required to be verified before permitting storage on the ECU 12. The authenticity check may require signing and verifying an entirety of the code, software, data, etc. with a digital signature before permitting its storage on the ECU 12. In the case of making changes to the application software and/or the calibration data, the authenticity check may require the changes to be digitally signed but that the entire set of code relying thereupon also be digitally signed and verified, e.g., compiled after each change.

The repeated signing and verifying of such ECU updates can be cumbersome and time consuming, particularly when developing, testing, or troubleshooting updates for use with the ECU 12. The authentication check, for example, may require an administrator to undertake laborious processes for generating and then verifying digital signatures each time a change is desired, no matter how small, which can be especially onerous when the administrator may be required to repeatedly test different value combinations before arriving at a suitable combination of values. One non-limiting aspect of the present disclosure contemplates the bootloader 54 being configured to perform a bypass operation to circumvent the authenticity check under certain circumstances.

When implemented, the bypass operation may correspond with the bootloader 54 permitting selectable partitions or portions of the memory to be programmed, change, adjusted, etc. without requiring the changes, memory, partitions, or the corresponding software, file, etc. to be digitally signed and/or verified. The bypass operation, instead, may be used to permit a user to make changes to certain portions of the memory 44 without requiring corresponding digital signatures of the affected software or coding. This can be beneficial in allowing an operator to perform trial and test processes whereby the calibration parameters can be incrementally altered and tested without having to undertake the more burdensome processes of the authenticity check while also avoiding the risks associated with signing software that is not intended for production use. The bypass operation may enable the bootloader 54 to interact with the programming tool 14, such as to receive the calibratable values or otherwise tune the calibration data, and thereafter program those values into the memory 48 for purposes of inducing corresponding changes in the operation of the application software. The bootloader 54 may be configured to compile or otherwise process the calibration values for storage on the calibration memory and thereafter instruct the application software to commence processing.

A tunable implementation memory 72 may be separately identifiable from and include a plurality of calibration parameters identical to the calibration parameters included within the calibration memory 60. The calibration data in each of the tunable implementation memory 72 and the calibration memory 60 may be initially programmed with the same factory calibration values. The tunable implementation memory 72 may be considered in this regard, at least initially, as a backup or duplicate of the calibration memory 60. The calibration and tunable implementation memories 60, 72 may be configured in this manner at the time of manufacture of the ECU 12. The calibration and tunable implementation memories 60, 72 may thereby match at the time of the ECU 12 leaving the factory of the ECU OEM and/or the host device OEM. The security control may correspond with the programming tool 14 changing one or more of the tunable values in the tunable implementation memory 72. The corresponding memory access may be limited to the module IDs noted in the G-SCAAT 20, i.e., the partitions of the tunable implementation memory 72 for each calibration module ID permitted/entitled to be tunable may be identified within the G-SCAAT 20.

The bootloader 54 may be configured to facilitate a tunable validation process for determining whether the tunable values input to the tunable implementation memory 72 are one of valid and invalid. The tunable values may be determined to valid if within limits specified in a tunable constraint memory 74, else the tunable values may be determined to be invalid. The tunable constraint memory 74 may be separately identifiable from the calibration and tunable implementation memories 60, 72. The tunable constraint memory 74 may be configured at the time of manufacture of the ECU 12 such that the limits therein may be selected by the OEM of the host device according to maximum values or ranges deemed suitable for operation of the ECU 12. These limits may deviate from nominal or media calibration values included in the calibration memory 60. The limits, as such, may be set based on the overall awareness of the OEM as to how much adjustment can be properly made while still accounting for corresponding influences on the host device and/or other dependent systems.

Figure 3:
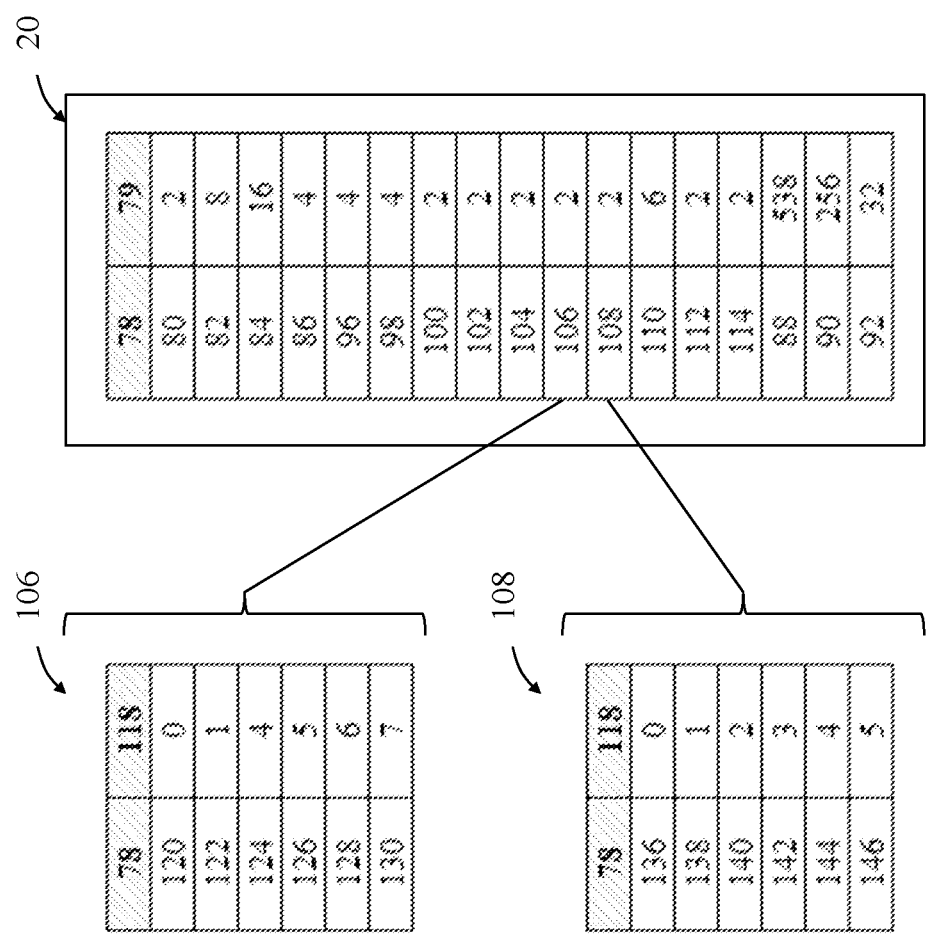
FIG. 3 illustrates a diagram of a G-SCAAT in accordance with one non-limiting aspect of the present disclosure.

FIG. 3 illustrates a diagram of the G-SCAAT 20 in accordance with one non-limiting aspect of the present disclosure. The G-SCAAT 20 may be loaded and installed on the ECU 12, optionally following an unlock or other security measure. The G-SCAAT 20, once stored on the secured memory 50, may be used in cooperation with the bootloader 54 to facilitate instantiating the ECU 12 and the application software at startup, and otherwise controlling the ECU 12 from power up until the application software commences. The G-SCAAT 20 may be a static file, such as one constructed of plain text and cryptographic constructs that the bootloader 54 may be configured to automatically process whenever the ECU 12 is being powered on. This may occur in response to host device and/or the ECU 12 being correspondingly transitioned from one state to another, which for example may coincide with ignition events of an automobile. The G-SCAAT 20, at least in this manner, may be configured to adjust operations of the bootloader 54 whenever the G-SCAAT 20 is installed on the ECU 12.

The bootloader 54 may optionally check a signature of the G-SCAAT 20 or perform another type of verification on the G-SCAAT 20 before installing or otherwise acting according to information stored therein. The bootloader 54 may also optionally include logic or other measures for ascertaining whether to initiate the application software according to the influences of the G-SCAAT 20 or whether it should instead ignore the G-SCAAT 20 and execute without its influence, such as according to previously defined factory settings. Further security measures, such as requiring the back office 16 to provide additional authentication data and/or the use of message authentication codes (MACs) may also be utilized alone and/or in combination with the seed-based request-response to facilitate unlocking the ECU 12 for installation of the G-SCAAT 20.

One non-limiting aspect of the present disclosure contemplates the G-SCAAT 20 being configured with a plurality of security parameters whereby values selected for certain ones of the security parameters may be individually tailored according to a role, a profile, or other construct assigned to an intended user, entity, etc. thereof, which for the sake of explanation are collectively without limitation referred to as a role. The security parameters may optionally be differentiated according to role-based parameters and non-role-based parameters. The role-based parameters may correspond with security values selected based on an identity of a user or other entity associated with the role selected and the non-role-based parameters, in contrast, may correspond with security values selected independently on the identity, e.g., non-role-based parameters may be selected based on the ECU, cryptographic constructs generated from the G-SCAAT, counters, non-user identifiers, etc.

The G-SCAAT 20 is shown to include a plurality of security parameters 78 with an exemplary listing of length (bytes) 79 for the corresponding security value. a plurality of the non-role-based parameters, which may include a module ID parameter 80, and ECU name parameter 82, an ECU ID parameter 84, an ECU ID extension parameter 86, a G-SCAAT signing certificate parameter 88, a signature parameter 90, and/or a MAC parameter 92. The module ID 80 parameter may correspond with a value set for uniquely identifying the G-SCAAT relative to other G-SCAATs 20. The ECU name parameter 82 may correspond with a value set for uniquely identifying a name of the ECU 12 to be used with G-SCAAT 20. The ECU ID parameter 84 may correspond with a value set for uniquely identifying ECU 12 relative to other ECUs 12, i.e., the ECU name 82 may be common to multiple ECUs 12 whereas the ECU ID 84 may be unique. The ECU ID extension parameter 86 may be configured to ensure uniqueness of the ECU identified to be associated with a particular G-SCAAT 20. The G-SCAAT signing certificate parameter 88 may correspond with a micro certificate, which may optionally include padding bytes generated by encrypting an entirety of the G-SCAAT 20. The signature parameter may correspond with a digital signature generated to verify authenticity of the G-SCAAT 20. The MAC parameter 92 may correspond with a hash or other variable generated for cryptographically identifying the G-SCAAT 20.

The role-based parameters may correspond with security parameters selected based on variables dependent on a role assigned to a particular user. The G-SCAAT 20 is shown to include a plurality of such role-based parameters, which may include a creation count parameter 96, an expiration count 98, an app not before ID (NBID) parameter 100, a hardware security module (HSM) NBID parameter 102, boot/software compatibility ID (BCID) parameter 104, a security controls parameter 106, an unlock levels parameter 108, a module IDs parameter 110, an options parameter 112, and/or an erase ignition parameter 114. The app NBID parameter 100 may be a numerical reference or counter stored on the G-SCAAT 20 at the time of generation for comparison to an application NBID stored on the ECU 12 and/or requested by the ECU 12 from the office 16. It may be helpful in assuring application software on the ECU 12 matches with application software intended to be manipulated with the G-SCAAT 20. The HSM parameter 102 may be a similar type of counter and used or assuring HSM on the ECU 12 matches with HMS intended to be manipulated with the G-SCAAT 20. The BCID parameter 104 may also be a similar type of counter and used for assuring boot/software on the ECU 12 matches with boot/software intended to be manipulated with the G-SCAAT 20. The module IDs parameter 110 may be used to identify partitions or clusters within the memory 44 capable of programmed, i.e., to define within the G-SCAAT 20 individual portions of the memory 44 capable of being programmed. The options parameter 112 may be used to schedule a duration of use for the G-SCAAT 20. The options parameter 112 may be set to a first value to limit the G-SCAAT 20 to a single installation/use, a second value for erasing and invalidating the G-SCAAT when a manufacturing enable counter (MEC) equals zero (vehicle manufacturing is complete), and a third value or invalidating the G-SCAAT 20 when the MEC is greater than zero (vehicle manufacturing is true) where the MEC is a security construct which additionally engages security methods post vehicle manufacturing when irreversibly set to zero. The erase ignition parameter 114 may be used to erase the G-SCAAT 20 after particular number of ignition cycles have occurred.

The security controls parameter 106 is shown in a callout as including a number of additionally selectable role-based security parameters with optional bit positions 118 that may be used to set particular security controls, which may include a security programming application software parameter 120, a secure programming calibration software parameter 122, an in-vehicle network message authentication parameter 124, a secure boot parameter 126, a host debugging parameter 128, and/or an HSM/trust zone debugging parameter 130. The security programming application software parameter 120 can be set to disable the bootloader 54 from having to perform secure programming signature checks on signed application code 58 software components. The secure programming calibration software parameter 122 can be set to disable the bootloader 54 secure programming signature checks on signed calibration software components, including calibration memory IDs. The in-vehicle network message authentication parameter 124 can be set to disable cryptographic MAC (Message Authentication Code) checks on in-vehicle network communication. Such MACs may be used to protect data in motion thru use of MAC tags appended to frames designated to require authenticity and integrity checks on data received by an ECU 12, which may be done to mitigate security risks and helpful in general for development testing. The secure boot parameter 126 may be set to disable secure boot checks, which unlike secure programming used validates soft parts (e.g., calibration and application software) while programming, the secure boot may be used to validate soft parts on every ECU 12 during power up. The host debugging parameter 128 may be set to enable a user to diagnostically interrogate and manipulate the normal memory 48 and firmware, such as to allow a debug port (e.g., Joint Test Action Group port (JTAG—IEEE Standard 1149.1-1990)) to be unlocked to establish an active debug session. The HSM/trust zone debugging parameter 130 may be set to enable a user to diagnostically interrogate and manipulate the secure zone 50 memory and firmware.

The unlock level parameter 108 is shown in a callout as including a number of additionally selectable role-based security parameters that may be used to lock/unlock diagnostics and other controllable functions, such as to generate roles for unlocking selectable service identifiers (SIDs) within Unified Diagnostic Services (UDS), e.g., International Organization for Standardization standard for the UDS entitled ISO 14229-1 Road vehicles-Unified diagnostic services (UDS), which is hereby incorporated by reference in its entirety. The unlock level parameter 108, for example, may include a service parameter 136, an assembly plant parameter 138, an OTA parameter 140, an engineering parameter 142, a remote diagnostics parameter 144, and/or a supplier parameter 146. The service parameter 136 may be set to unlock diagnostic levels opened with SID 0x01 (request seed ECU programming) and SID 0x11 (request seed extended reflash). The assembly plant parameter 138 may be set to unlock diagnostic levels opened with SID 0x03 (request seed assembly plant programming) and 0x13 (request seed extended reflash plant programming). The OTA parameter 140 may be set to unlock diagnostics levels opened with SID 0x05 (request seed OTA reflash) and 0x15 (request seed extended reflash OTA). During parameter 142 may be set to unlock diagnostic levels opened with SID 0x09 (request seed engineering) the remote diagnostics parameter 144 may be set to unlock diagnostic levels opened was SID 0x0B (request seed remote diagnostics). The supplier parameter 146 may be set to unlock diagnostic levels opened with SID 0x0D a seed supplier security access).

The combination of values included within the G-SCAAT 20 may be selected according to roles assigned to particular users. User may be required to provide identification, trust credentials, authorization from a supervisor/OEM, or other information associated with generating an assessment as to uses reasoning for programming the ECU 12. This information may be parsed to identify an appropriate role of the available roles for the user. This process may be performed by a network administrator and/or automatically as a function of a electronically provided information, e.g., the user may provide trust credentials or other information to a website or portal associated with the back office 16, whereby the back office 16 may automatically process the corresponding information to select an appropriate role for the user and thereafter use values associated with the selected role for populating, e.g., setting the values, flags, variables, etc. within the G-SCAAT 20 to match the entitlements and permissions assigned to the corresponding role. After the present disclosure, at least in this manner, contemplates a granular approach for specifically locking/unlocking or otherwise enabling/to enabling security controls other features available on the ECU 12 according to value set within the G-SCAAT 20 a plurality of security parameters.

One role may correspond with an administrator role. The administrator role may be a highly trusted, sensitive, and restricted role for which the ability to assign non-administrator roles to individual users may exist. The administrator role may effectively designate an individual to act as a gate keeper for allowing users to access back office 16 for purposes of generating a G-SCAAT 20 such that the administrator role may be used to approve user roles with each user roles being assigned different periods such as a one-time use or for the duration of their role.

Another role may correspond with an engineering software class role, optionally with segmentation into definable classes or sub-roles, e.g., classes 1 through n. The software role may be helpful with the large number of ECU 12 types (PCMs, ECM, TCMs, CGM, TCU, EBCM, Amp, Radio, etc.) and the large number of developers for the ECU types as it may limit the number of individuals that are able to generate G-SCAATs 20 for any given ECU 12 and then again limit the miscellaneous security controls for which each user is empowered to disable in order to support their role in development, manufacturing, or service. For a given ECU type, there are bootloader developers, basic software developers (the software which abstracts the application code from processor hardware), application code developers, calibration engineers, diagnostics engineers, cybersecurity engineers, DREs (Design Release Engineers who own the official release of production ready ECU types), manufacturing engineers, hardware engineers, quality engineers, and service engineers. With the granular controls described herein then, a role-based relationship to security can be finely governed and regulated so as to provide the least privilege to a given user.

Another role may correspond with a proxy user role, optionally with segmentation into definable classes or sub-roles, e.g., classes 1 through n. The proxy user role may be used to enabling tuning, such as for aftermarket tuning. This role would be empowered to support the corporate processes and access the needed infrastructure to generate G-SCAATs for one or more ECU types and would have the ability to use the module ID parameter 110, the creation count parameter 96, and the erase ignition cycle parameter 114 to support generating tuning demo G-SCAATs using IGN or creation counter temporal mechanisms or fully paid G-SCAATs not dependent on time.

Another role may correspond with a warranty role, optionally with segmentation into definable classes or sub-roles, e.g., classes 1 through n. The warranty analysis role be used to provide a temporal component to the programming of the ECU 12, e.g., duration of G-SCAAT validity (IGN Cycles, 1 time, Creation Count, MEC value, etc.) in order to allow ECUs 12 to be re-programmed for warranty purposes without having to use security tickets or other unlock measures having a potentially indefinite duration or potentially providing greater unlock capabilities than needed to address the warranty concerns. The warranty role may be used to generate limited duration G-SCAATs 20, optionally restricted to individual ECUs 12, whereafter the G-SCAAT 20 may be automatically invalid. This automatic invalidity and ability to limit use with particular ECUs 12 may be helpful in avoiding scrap cost historically incurred as a result of having to scrap ECUs 12 when a security ticket or other unlock becomes compromised during warranty repair due to the scope of such an event being limited to particular duration and/or an identifiable number of ECUs 12.

Figure 4:
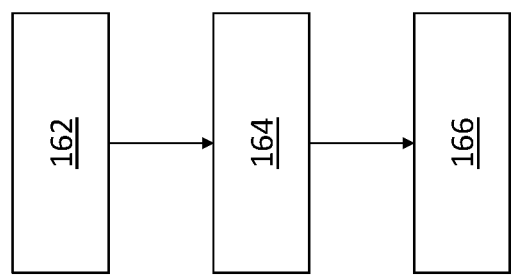
FIG. 4 illustrates a flowchart of a method for securing the ECU in accordance with one non-limiting aspect of the present disclosure.

FIG. 4 illustrates a flowchart of a method for securing the ECU 12 in accordance with one non-limiting aspect of the present disclosure. Block 162 relates to a G-SCAAT generation process for generating the G-SCAAT 20. The generation process may include the back office 16 receiving a request associated with a user requesting a G-SCAAT 20 for purpose of securing, programming, etc. the ECU 12. The request message may be received through the portal 24 and/or through other communication, such as an email from an authorizing supervisor, a phone call, etc. The request message may optionally include a trust credential and/or other identifying information, such as a name and an ID for the ECU(s) 12 intended for use with the requested G-SCAAT 20. The generation process may include an assignment stage whereby the back office 16 selects a role, a profile, etc. for the user from a plurality of available roles, profiles, etc. The role may be based on predefined authorizations associated with an identity of the requester, such as in a lookup table and/or an algorithm. The requesting entity may optionally be required to provide a questionnaire or fill out other information to be processed, optionally according to predefined computing processes, to facilitate identifying a suitable one or more of the roles.

Block 164 relates to an installation process associated with installing the G-SCAAT 20 on ECU 12, such as with request-response process, e.g., request SID 0x27 and response SID 0x67 of the UDS protocol. The request-response process may include the back office 16 provide the ECU 12 with a back office counter for the G-SCAAT 20. The installation process may optionally include transitioning the G-SCAAT 20 from the normal zone 48 to the secure zone 50, which may be used to thwart changes thereto following installation.

Block 166 relates to performing an authentication process after installing the G-SCAAT 20. The authentication process including processing the back office counter and the ECU generating one of a pass determination and a fail determination for an authenticity of the G-SCAAT 20 depending on whether the back office counter matches a counter included as part of the G-SCAAT 20. The back office counter may be a monotonically increasing counter kept at the back office from creation of the G-SCAAT 20 and/or from the time of installing the G-SCAAT 20 on the ECU 12. The expiration count 98 within the G-SCAAT 20 may be compared to the back office counter provided to the ECU 12 when the ECU 12 is unlocked. If the expiration count 98 fails to be greater than the received/authenticated back office counter, then the G-SCAAT 20 may be considered as invalid. The bootloader 54 may rely on a creation count 96 included in the G-SCAAT 20 to assess validity of the G-SCAAT 20. The creation count 96 may be used in this manner to prevent a G-SCAAT 20 from being reinstalled on an ECU 12 that it was previously erased from. The creation count 96 can be correspondingly compared to a stored creation count within the ECU 12, which may be a value set from the last valid G-SCAAT installed. The value in the G-SCAAT 20 may thereby need to be greater than the stored value in the ECU 12 in order for the G-SCAAT 20 to be considered valid.

The authentication process, optionally a separate logging or tracking process, may occur following successful or unsuccessful authentication of the G-SCAAT 20. The login process may include generating a log message indicating the pass or fail determination, and optionally storing the log message on within the secure zone 50 each time an authentication and/or an installation of the G-SCAAT is undertaken. The tracking process may include the back office 16 requesting or the ECU 12 automatically transmitting the log messages. Tracking process may include performing security incident and event monitoring to detect unauthorized activities, e.g., the use of the G-SCAAT 20 under circumstances differing from those specified in the security parameters.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for securing an electronic control unit (ECU) comprising:
   receiving a request associated with a user requesting to program the ECU;
   selecting a role for the user from a plurality of available roles;

generating a granular security control adjustment authorization ticket (G-SCAAT) for securing the ECU according to a plurality of security parameters determined based on to the role selected for the user, including specifying security values within the G-SCAAT to be used in controlling the ECU to operate according to the security parameters; and associating a back office counter with the G-SCAAT, the back office counter configured to monotonically increase a counter value set for the G-SCAAT according to a predefined schedule.

2. The method according to claim 1 further comprising performing an authentication process at the ECU based at least in part on receipt of the back office counter, the authentication process configured to generate one of a pass determination and a fail determination for an authenticity of the G-SCAAT.

3. The method according to claim 2 further comprising generating the pass determination if the back office counter matches an expiration counter included as part of the security values, and generating the fail determination if the back office counter fails to match the expiration counter.

4. The method according to claim 3 further comprising defining the pass determination to additionally require a message authentication code (MAC) included as part of the G-SCAAT to match with an ECU MAC generated at the ECU.

5. The method according to claim 2 further comprising transmitting a log message from the ECU to a back office indicating the pass or fail determination, the back office configured to generate the G-SCAAT and associate the back office counter therewith.

6. The method according to claim 5 further comprising executing a request-response strategy between the ECU and the back office as at least part of an installation process configured to install the G-SCAAT on the ECU.

7. The method according to claim 1 further comprising defining each of the plurality of available roles to each include at least one security value differing from the security values of the other roles.

8. The method according to claim 1 further comprising determining the security parameters to include a plurality of role-based parameters and a plurality of non-role-based parameters, the role-based parameters having corresponding ones of the security values set according to the role selected, the non-role-based parameters having corresponding ones of the security values set independently of the role selected.

9. The method according to claim 1 further comprising determining the security parameters to include one or more partitions within a memory of the ECU capable of being unlocked, and specifying a module identifier (ID) for each partition as part of the security values.

10. The method according to claim 1 further comprising determining the security parameters to include one or more security control parameters, and specifying one of the security values for each security control parameter.

11. The method according to claim 10 further comprising determining the security control parameters to include a secure programming application software parameter, a secure programming calibration software parameter, an in-vehicle network message authentication parameter, a secure boot parameter, a host debugging parameter, and a hardware security module (HSM) or trust zone debugging parameter.

12. The method according to claim 1 further comprising determining the security parameters to include one or more diagnostic unlock level parameters, and specifying one of the security values for each unlock level parameter.

13. The method according to claim 12 further comprising determining the diagnostic unlock level parameters to include a service parameter, an assembly plant parameter, an over-the-air (OTA) parameter, an engineering parameter, a remote diagnostics parameter, and/or a supplier parameter.

14. The method according to claim 1 further comprising determining the security parameters to include a creation count parameter, an expiration count parameter, an application not before identifier (NBID) parameter, a hardware secure module (HSM) NBID parameter, a boot/software compatibility ID (BCID) parameter, a security controls adjusted parameter, an unlock levels parameter, a module IDs parameter, an options parameter, and an ignition count parameter.

15. The method according to claim 14 further comprising determining the security parameters to include an ECU name parameter, an ECU ID parameter, a G-SCAAT signing certificate parameter, a signature parameter, and a message authentication code (MAC) parameter.

16. A method for securing an electronic control unit (ECU) comprising:

selecting a profile for securing the ECU from a plurality of available profiles, each of the profiles defining a plurality of security parameters for correspondingly securing the ECU;

generating a granular security control adjustment authorization ticket (G-SCAAT) for installation on the ECU according to the security parameters determined based on the profile selected, including specifying security values within the G-SCAAT for each of the security parameters defined for the profile selected, the ECU configured to secure the ECU according to the security values specified in the G-SCAAT; and associating a back office counter with the G-SCAAT, the back office counter configured to monotonically increase a counter value set for the G-SCAAT according to a predefined schedule.

17. The method according to claim 16 further comprising:

performing an authentication process after installing the G-SCAAT on the ECU, the authentication process including the ECU generating one of a pass determination and a fail determination for an authenticity of the G-SCAAT depending on whether the back office counter matches an expiration counter included as part of the security values; and transmitting a log message from the ECU to the back office indicating the pass or fail determination.

18. The method according to claim 16 further comprising defining each of the plurality of available profiles to each include at least one security value differing from the security values of the other roles, and determining the security parameters to include a plurality of role-based parameters and a plurality of non-role-based parameters, the role-based parameters having the corresponding security values set according to a role of a user associated with the profile selected, the non-role-based parameters having the corresponding security values set independently of the role selected.

19. A method for securing an electronic control unit (ECU) comprising:

receiving a request associated with a user requesting to program the ECU;

selecting a role for the user from a plurality of available roles;

generating a granular security control adjustment authorization ticket (G-SCAAT) for installation on the ECU according to a plurality of security parameters determined based on to the role selected for the user, the G-SCAAT specifying one or more security values for each of the security parameters;

transmitting the G-SCAAT from a back office to the ECU as part of an installation process, the ECU configured to secure the ECU according to the security values specified in the G-SCAAT;

transmitting a log message from the ECU to the back office in response to the ECU performing an authentication process for authenticating the security values following installation of the G-SCAAT, the log message identifying one of a pass determination and a fail determination for the authentication process; and associating a back office counter with the G-SCAAT, the back office counter configured to monotonically increase a counter value set for the G-SCAAT according to a predefined schedule.

* * * * *